US008727590B2

(12) United States Patent
Kinoshita

(10) Patent No.: US 8,727,590 B2
(45) Date of Patent: May 20, 2014

(54) VEHICLE HEADLAMP

(75) Inventor: Makoto Kinoshita, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 336 days.

(21) Appl. No.: 13/208,424

(22) Filed: Aug. 12, 2011

(65) Prior Publication Data

US 2012/0051078 A1 Mar. 1, 2012

(30) Foreign Application Priority Data

Aug. 24, 2010 (JP) ................................ 2010-186805

(51) Int. Cl.
*B60Q 1/04* (2006.01)

(52) U.S. Cl.
USPC ............................ 362/538; 362/539; 362/509

(58) Field of Classification Search
USPC .......... 362/516–519, 538, 539, 509, 514, 263
See application file for complete search history.

(56) References Cited

U.S. PATENT DOCUMENTS

| | | | | |
|---|---|---|---|---|
| 5,243,501 | A * | 9/1993 | Makita et al. | 362/510 |
| 5,394,310 | A * | 2/1995 | Iwasaki | 362/538 |
| 6,607,295 | B2 * | 8/2003 | Hayakawa | 362/517 |
| 8,235,570 | B2 * | 8/2012 | Okubo et al. | 362/539 |

FOREIGN PATENT DOCUMENTS

| | | |
|---|---|---|
| JP | 2010-123404 A | 6/2010 |
| JP | 2010-153333 A | 7/2010 |

* cited by examiner

*Primary Examiner* — Bao Q Truong
(74) *Attorney, Agent, or Firm* — McDermott Will & Emery LLP

(57) ABSTRACT

A vehicle headlamp includes a light source; a projection optical system that includes a projection lens projecting an image, formed by a light beam emitted from the light, source, forward of the vehicle; and a reflection optical system including a parabolic reflector that is provided at a position offset from the projection lens as viewed from the front of the vehicle, and that reflects the light beam emitted from the light source and irradiates the same in front of the vehicle, wherein the reflector has a light distribution pattern irradiating a region including a cut line, and the projection optical system has a light distribution pattern irradiating downward with respect to the reflector.

2 Claims, 8 Drawing Sheets

VEHICLE HEADLAMP

CROSS-REFERENCE TO RELATED APPLICATIONS

The present application claims priority from Japanese Patent Application No. 2010-186805 filed on Aug. 24, 2010, the entire contents of which are hereby incorporated by reference.

BACKGROUND OF THE INVENTION

1. Field of the Invention

The present invention relates to a headlamp that is provided to a vehicle such as an automobile, and has a projection optical system such as a projector lens, and more particularly to a headlamp that eases an illumination change in the vicinity of a cut line formed at a front end (upper end) of a light distribution pattern for glare proof.

2. Description of Related Art

There has been known, as a headlamp for a vehicle such as an automobile, a projector-type headlamp that converges a light beam from a bulb, serving as a light source, with a convergent reflector and projects the light beam forward by using a projection lens.

In a light distribution on pattern for passing by an oncoming vehicle (low beam) for preventing glare to the oncoming vehicle, the aforementioned projector-type headlamp is provided with a shade that blocks a part of a light beam at the rear of the projection lens in order to form a desired cut line for cutting a light flux at the side of an opposite lane.

It has been proposed that a parabolic reflector that reflects a light beam emitted from the same light source so as to irradiate a portion ahead the vehicle is added to the projector-type headlamp.

As a conventional technique relating to the headlamp using both the projection optical system and the parabolic reflector described above, for example, Japanese Patent Application Laid-Open (JP-A) No. 2010-153333 describes a vehicle headlamp that guides a part of a light beam emitted from a light source to an auxiliary reflector, which is provided diagonally backward above a projection lens, and irradiates the same in front of the vehicle from the auxiliary reflector without passing through the projection lens as a high-beam spot light. In the technique described in the JP-A No. 2010-153333, a cut line in a low beam is formed by blocking a part of light incident on the projection lens by an edge of a shade arranged at the rear of the projection lens.

JP-A No. 2010-123404 describes a vehicle headlamp that guides a part of a light beam emitted from a light source to an additional reflector provided diagonally backward below a projection lens, and irradiates the same from the additional reflector with a light distribution pattern spreading in the lateral direction below a cut-off line.

In the technique described in the JP-A No. 2010-123404, a cut line is formed by a movable shade provided in the vicinity of a rear-side focal point of a projection lens.

In a general projector-type headlamp in which a portion ahead a vehicle is irradiated only by a projection optical system, and a cut line is formed by a shade arranged backward of the projection lens, illumination intensity sharply changes in the vicinity of the cut line, whereby contrast increases.

In the JP-A Nos, 2010-153333 and 2010-123404 described above, the out line in a low beam is formed by the shade provided to the projection optical system, the property described above is similarly applied thereto.

When an optical axis is changed clue to vehicle pitching, etc., a range that can be visually confirmed by a driver sharply changes, which might confuse the driver.

It is supposed that a driver goes back and forth between a country where drivers keep to the right side of the road and a country where drivers keep to the left side of the road. In this case, a reflector-type headlamp can easily prevent glare to an oncoming vehicle by attaching a seal-type light shielding member to an outer lens. However, this measure cannot be applied to a projector-type headlamp. Therefore, it is necessary to suppress a light distribution to a distance or to add a unit for changing the shade that forms the cut line and the like in order to prevent glare in either of left-hand traffic and right-hand traffic.

When a high-intensity discharge (HID) bulb, which has recently been increasingly used, is used as a light source, a light-emitting portion is relatively large, and its outer edge is not clear, unlike a halogen bulb that is relatively close to a point light, source because only a filament emits light. Therefore, in order to satisfactorily form a cut line on a projector-type headlamp, a light-shielding pattern having a shape of a stripe has to be provided on the surface of the bulb, resulting in that efficiency is deteriorated due to a loss of light flux.

SUMMARY OF THE INVENTION

In view of the foregoing problem, the present invention aims to provide a vehicle headlamp that has a projection optical system and that eases a change in illumination intensity in the vicinity of a cut line.

The present invention solves the above-mentioned problem by means described below.

A first aspect of the present invention is a vehicle headlamp including a light source; a projection optical system that includes a projection lens projecting an image, formed by a light beam emitted from the light source, in front of the vehicle; and a reflection optical system including a parabolic reflector that is provided at a position offset from the projection lens as viewed from the front of the vehicle, and that reflects the light beam emitted from the light source and irradiates the same in front of the vehicle, wherein the reflection optical system has a light distribution pattern irradiating a region including a cut line, and the projection optical system has a light distribution pattern irradiating downward with respect to the reflection optical system.

According to the first aspect of the present invention, the light distribution is designed by enlarging or reducing a focal point on the reflection surface of the parabolic reflector, whereby the change in the illumination intensity in the vicinity of the cut line becomes moderate. Accordingly, it can be prevented that a range that can be visually confirmed by a driver sharply chances, even when an optical axis is changed due to vehicle pitching etc.

Even when the high-intensity discharge bulb is used, it is not necessary to provide a stripe light-shielding unit or the like, whereby a highly-efficient bulb having a large light quantity and having large light flux can be used.

Since the projection optical system irradiates downward with respect to the reflector, the degree of freedom of designing the light, distribution is increased, and visibility of the portion just before the vehicle or a road shoulder can be enhanced.

Furthermore, by attaching a detachable light-shielding member such as a seal to an outer lens, the vehicle can easily meet the glare-proof requirement in a country where the driver keeps to the side opposite to the side in Japan.

A second aspect of the present invention is the vehicle headlamp according to the first aspect, wherein a light-shielding unit for forming the cut line is provided at at least either one of a portion between the light source and the reflector and a front portion of the reflector.

According to the second aspect of the present invention, the cut line can be formed to be suitable for the irradiation light from the reflector.

A third aspect of the present invention is the vehicle headlamp according to the first aspect, wherein at least a part of the reflector is disposed above the lower end of the projection lens.

A fourth aspect of the present invention is the vehicle headlamp according to the second aspect, wherein at least a part of the reflector is disposed above the lower end of the projection lens.

In general, light emitted from below the high-intensity discharge bulb might be yellowish due to the influence of deposition of a compound contained therein. Therefore, when this light is utilized as the irradiation light from the headlamp, a complementary lens or the like is needed in order to make this light close to white light. However, according to the third and fourth aspects of the present invention, the reflector irradiates forward the light beam, emitted from above the light source or from the side of the light source, whereby the complementary process described above is unnecessary. Accordingly, the structure can be simplified.

As described above, the present invention can provide a vehicle headlamp that has a projection optical system and that eases a change in illumination intensity in the vicinity of a cut line.

DETAILED DESCRIPTION OF THE PREFERRED EMBODIMENTS

In order to provide a vehicle headlamp that includes a projection optical system and that eases a change in illumination intensity in the vicinity of a cut line, a parabolic reflector, which irradiates forward a light emitted from a high-intensity discharge bulb serving as a light source, is disposed above and at a side of the projection optical system such as a projector lens, whereby a cut line is formed with a light beam from the parabolic reflector, and the portion close to the vehicle from the cut line is irradiated by the light beam from the projection optical system.

(Embodiment)

A vehicle headlamp to which an embodiment of the present invention is applied will be described below.

vehicle headlamp according to the embodiment is disposed at a front part of a body of an automobile such as a passenger car, for example.

Figure 1:
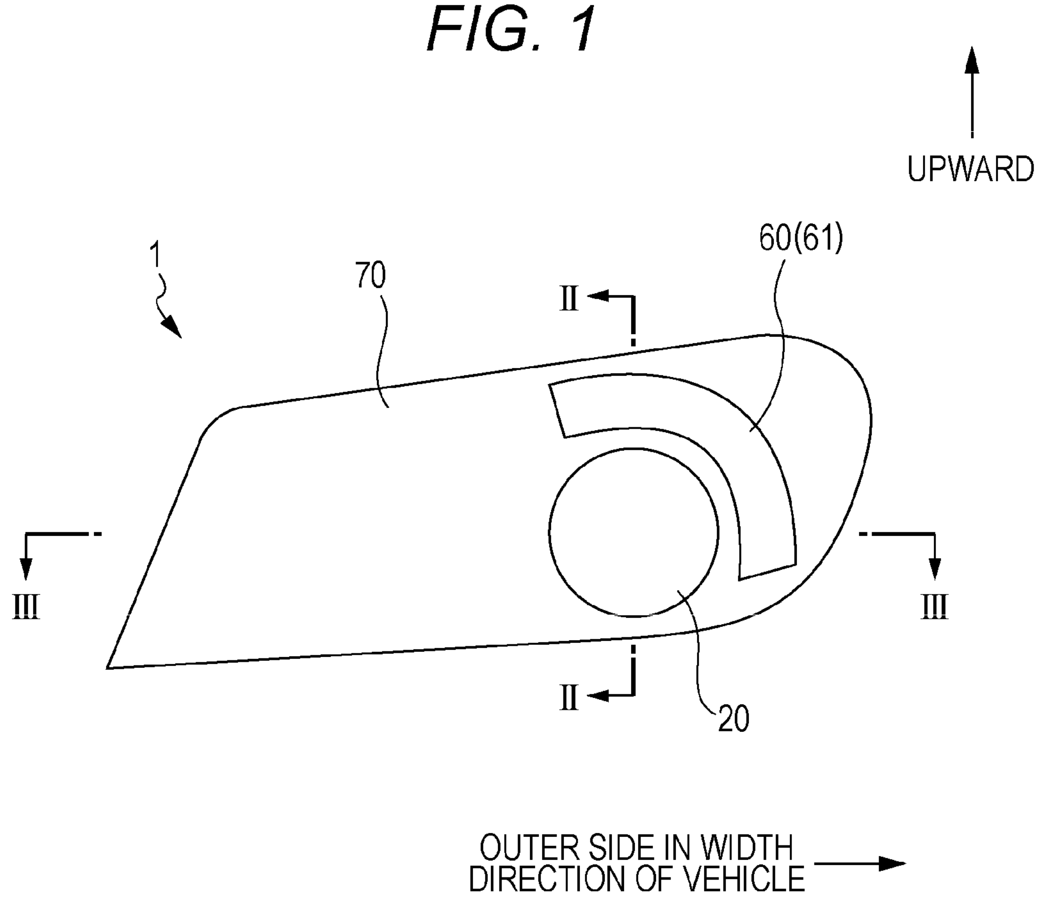
FIG. 1 is a schematic outline view of a vehicle headlamp to which an embodiment of the present invention is applied, wherein the headlamp is viewed from ahead of the vehicle.
Figure 2:
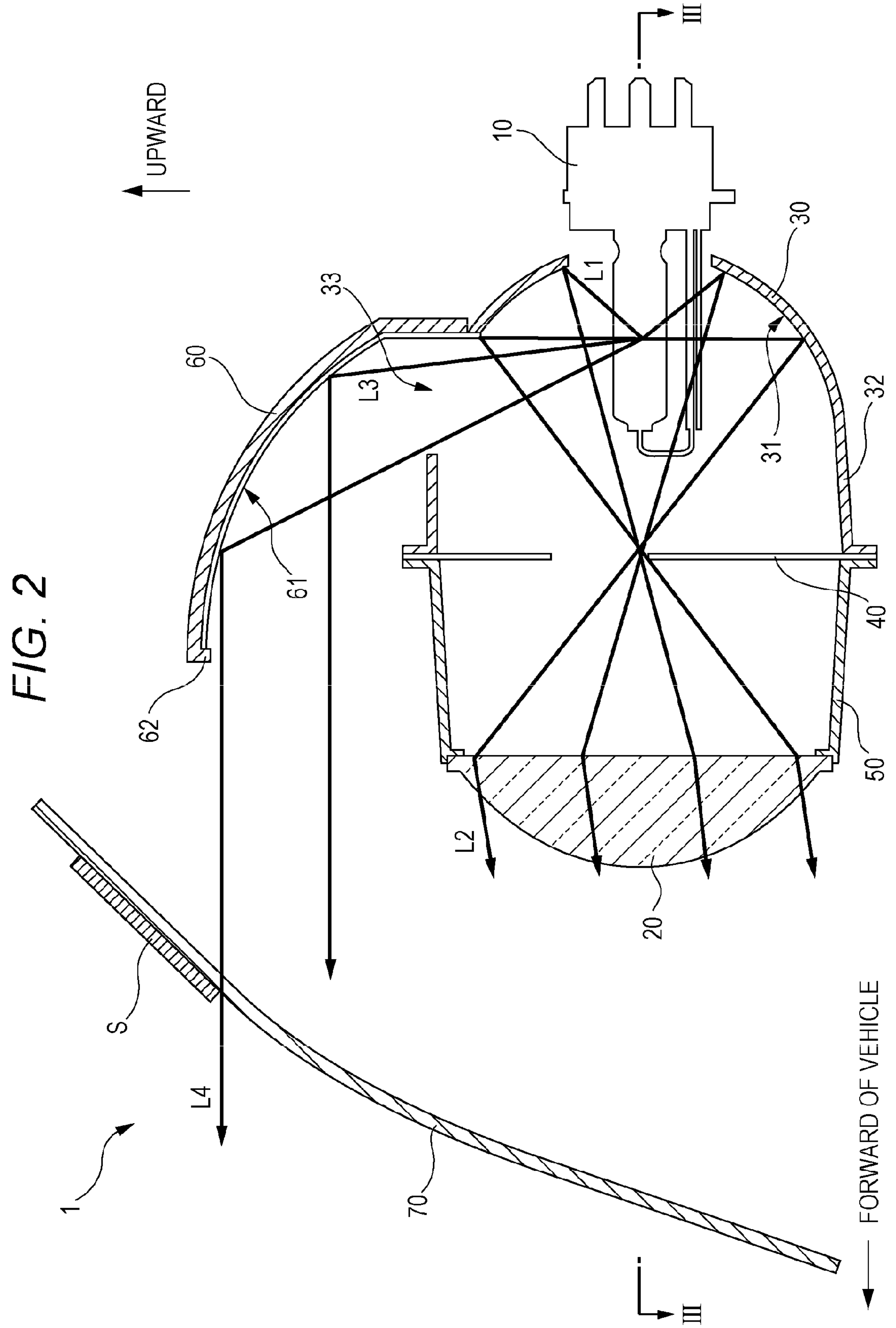
FIG. 2 is a sectional view (sectional view taken along a line II-II in FIGS. 1 and 3) of the vehicle headlamp according to the embodiment, wherein the headlamp is viewed as cut in a vertical plane, which passes through a center of a bulb and is along a front-to-rear direction of a vehicle.
Figure 3:
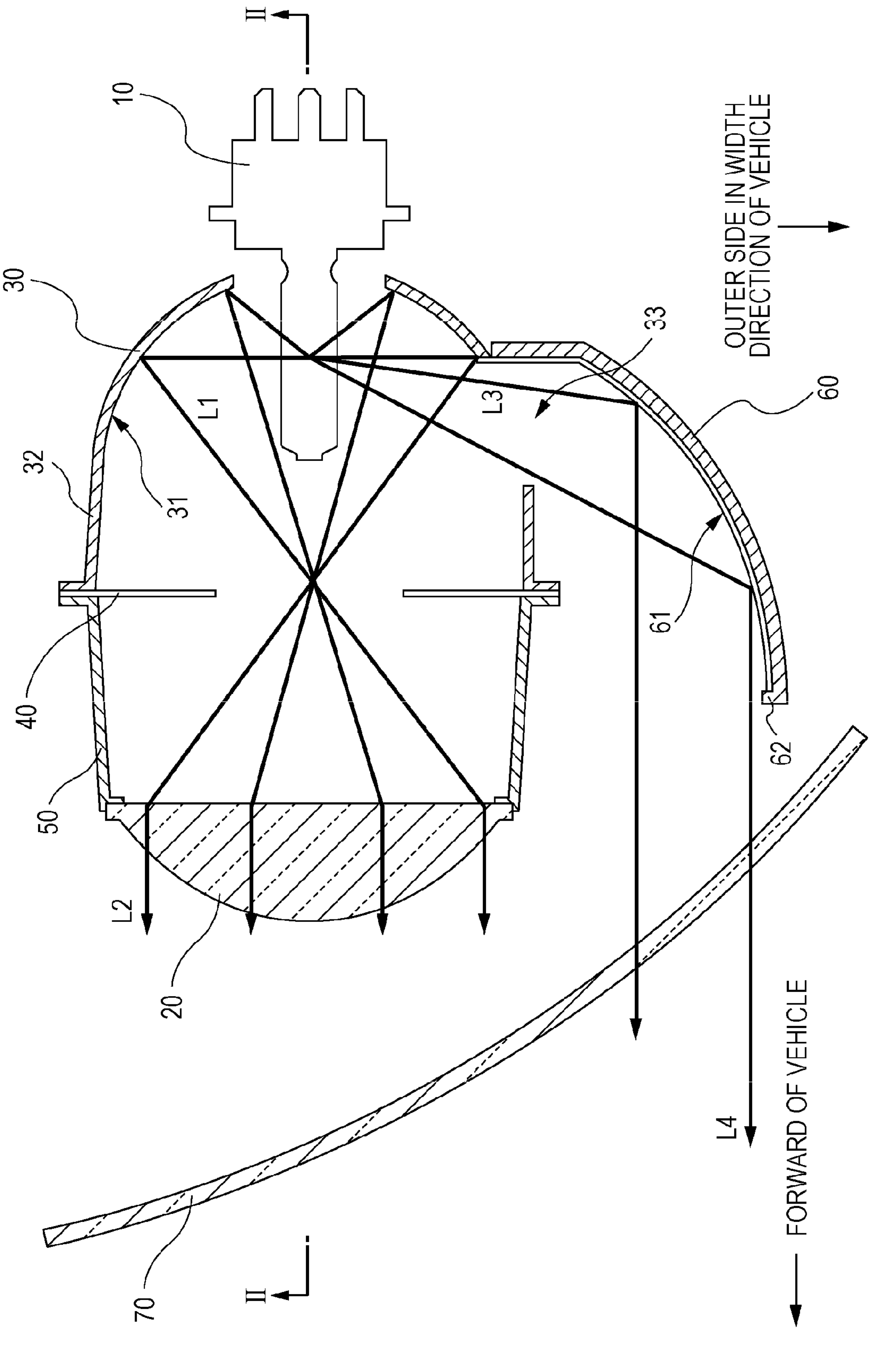
FIG. 3 is a sectional view (sectional view taken along a line III-III in FIGS. 1 and 2) of the vehicle headlamp according to the embodiment, wherein the headlamp is viewed as cut in a horizontal surface passing through the center of the bulb.

As illustrated in FIGS. 1 to 3, a vehicle headlamp 1 includes a bulb 10, a projector lens 20, a convergent reflector 30, a shade 40, a lens holder 50, a parabolic reflector 60, and an outer lens 70 etc.

The above-mentioned light source, optical system, and the like other than the outer lens 70 are used for a light distribution for passing by an oncoming vehicle (low beam) of the vehicle headlamp 1, and the vehicle headlamp 1 also includes a light source and an optical system for a light distribution for traveling (high beam), which are not illustrated.

The bulb 10 serves as a low-beam light source of the vehicle headlamp 1, wherein a high-intensity discharge (HID) bulb is used for example.

The bulb 10 is inserted from the back of the convergent reflector 30 with the center axis being substantially along a front-to-rear direction of the vehicle, and supported by an unillustrated bulb holder.

The projector lens 20 is, for example, a plano-convex lens having a convex surface at its front side and a plane surface at its rear side. The projector lens 20 is arranged in front of the bulb 10.

The projector lens 20 projects an image on a focal plane, including a rear-side focal point, in front of the vehicle as a reverted image.

The convergent reflector 30 has an elliptic reflection surface 31 including a first focal point arranged in the vicinity of the center of a light-emitting portion of the bulb 10 and a second focal point that substantially agrees with the rear-side focal point of the projector lens 20.

The elliptic reflection surface 31 reflects a light beam 101 emitted diagonally backward from the bulb 10, and allows the light beam L1 to be converged on the vicinity of the rear-side focal point of the projector lens 20. After passing through the projector lens 20, the light beam L1 is irradiated forward as a light beam L2 that is generally a parallel light.

The convergent reflector 30 also has a cylindrical part 32 that extends forward of the vehicle from an effective reflection surface for holding the shade 40 and the lens holder 50.

An opening 33 that introduces a light beam L3, emitted from the upper part and the side part of the bulb 10 into the parabolic reflector 60, is formed from the upper part of the cylindrical part 32 toward the outer side thereof in the width direction of the vehicle.

The shade 40 is provided in the vicinity of the rear-side focal point of the projector lens 20, and it blocks a part of the light beam L1, reflected by the convergent reflector 30, so as to form a desired light distribution pattern on the light beam L2 emitted from the projector lens 20.

The lens holder 50 is a member for holding the projector lens 20. The lens holder 50 is formed into a cylindrical shape that is generally concentric with the optical axis of the projector lens 20, and fitted to the front end of the projector lens 20. A flange at the rear end of the lens holder 50 abuts a flange formed at the front end of the cylindrical part 32 of the convergent reflector 30, and with this state, they are fixed.

The outer edge of the shade 40 described above is fixed as nipped between the lens holder 50 and the convergent reflector 30.

The parabolic reflector 60 has a concave-curved parabolic reflection surface 61 that reflects the light beam L3, emitted from the upper side and the outer side of the bulb 10 in the width direction of the vehicle, in front of the vehicle as a light beam L4 that is generally a parallel light.

As illustrated in FIG. 1, the parabolic reflector 60 is arranged from the portion above the projector lens 20 toward the outer side in the width direction of the vehicle, as viewed from the front of the vehicle, wherein it is formed to have substantially an arc shape.

In the present embodiment, the whole parabolic reflector 60 is arranged, for example, above the lower end of the projector lens 20.

A light-shielding portion 62, which projects toward the optical, path (toward the projector lens 20) in the form of a flange, is formed integral with the edge of the parabolic reflector 60 at the front part of the vehicle.

The light-shielding portion 62 forms a cut line (cut-off line) of a low-beam light distribution of the vehicle headlamp 1 in cooperation with the opening 33 of the convergent reflector 30.

The outer lens 70 is arranged in front of the projector lens 20 and the parabolic reflector 60. It is a cover member made of a transparent resin for constituting a part of an exterior of the vehicle.

The outer lens 70 is arranged to be tilted such that, as viewed from the side in FIG. 2, the upper end retreats with respect to the lower end, and as viewed in a plane in FIG. 3, the outer side in the width direction of the vehicle retreats with respect to the inner side.

When the vehicle, in which the vehicle headlamp 1 has a light distribution pattern for left-hand traffic, keeps to the right, for example, a light-shielding seal S is attached to a predetermined portion on the upper outer surface of the outer lens 70 in order to prevent glare to an oncoming vehicle that travels on a left-hand lane from the vehicle.

The light-shielding seal S has a function of blocking a part of the light beam L4 in the vicinity of the cut line at the side of the opposite lane so as to substantially lower the cut line.

When the vehicle again keeps to the left side of the road, for example, the light-shielding seal S is peeled.

When the vehicle headlamp 1 has a light distribution pattern for right-hand traffic, for example, the light-shielding seal S is attached when the vehicle keeps to the left side of the road.

Figure 4:
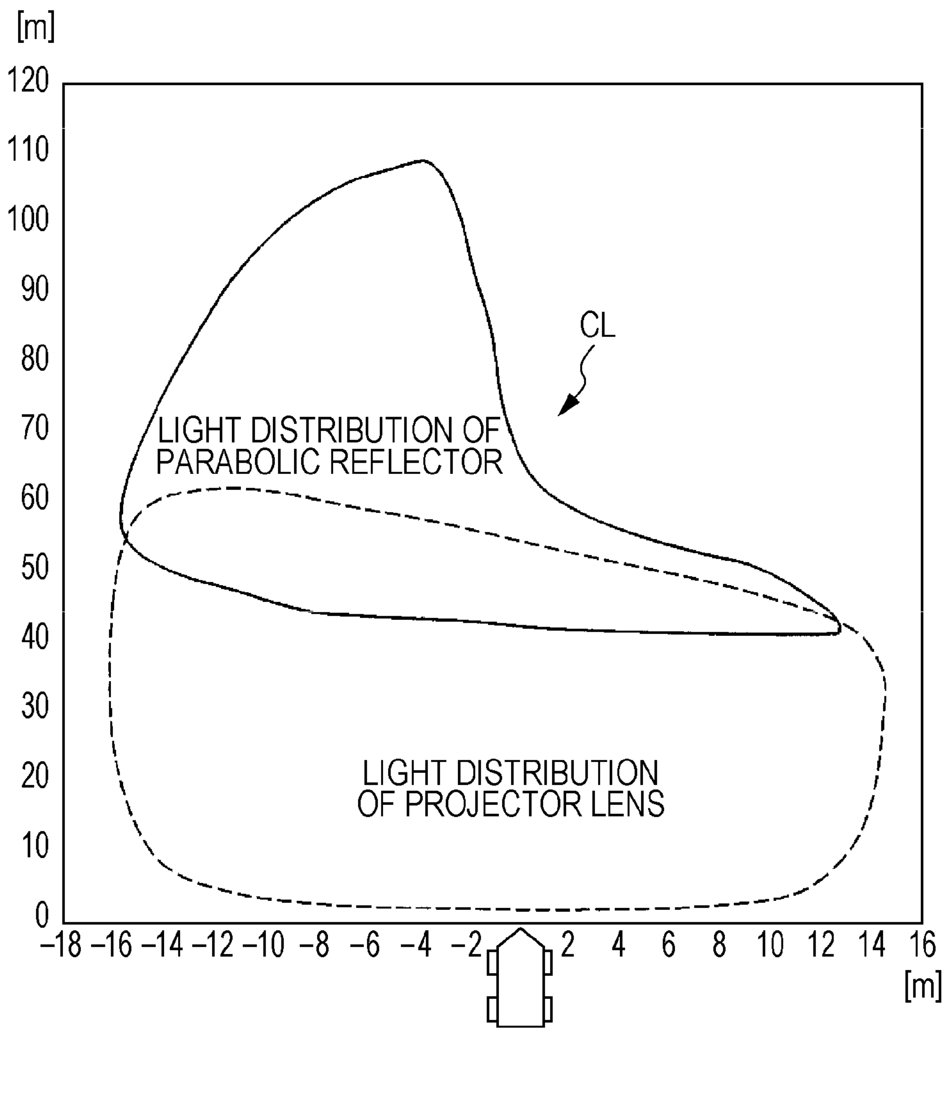
FIG. 4 is a view illustrating a light distribution pattern of the vehicle headlamp according to the embodiment.

FIG. 4 is a view illustrating a low-beam light distribution for left-hand traffic in the vehicle headlamp 1 according to the embodiment.

In FIG. 4, the light distribution pattern by the parabolic reflector 60 is indicated by a solid line, while the light distribution pattern by the projector lens 20 is indicated by a broken line.

In the embodiment, the light distribution to a distance (upward) from the vehicle is performed by the parabolic reflector 60, while the light distribution toward the near side (downward) of the vehicle is performed by the projection optical system such as the projector lens 20.

In order to prevent the glare to the oncoming vehicle when the vehicle keeps to the left side of the road, a cut line CL for cutting a light flux ahead (upward) on the right is formed at the side of the parabolic reflector 60, while the light beam L2 from the projector lens 20 irradiates the downward part from the parabolic reflector 60 so as not to reach the cut line CL.

Effects of the above-mentioned embodiment will next be described in comparison with a comparative example 1 and a comparative example 2 of the present invention.

The parts in the comparative examples 1 and 2 substantially common to those in the above-mentioned embodiment are identified by a numeral having same last two digits, and the description will be omitted. Different points will mainly be described.

COMPARATIVE EXAMPLE 1

A vehicle headlamp 101 of the comparative example 1 is a typical projector-type headlamp that forms a low-beam light distribution pattern with only a projection optical system.

Figure 5:
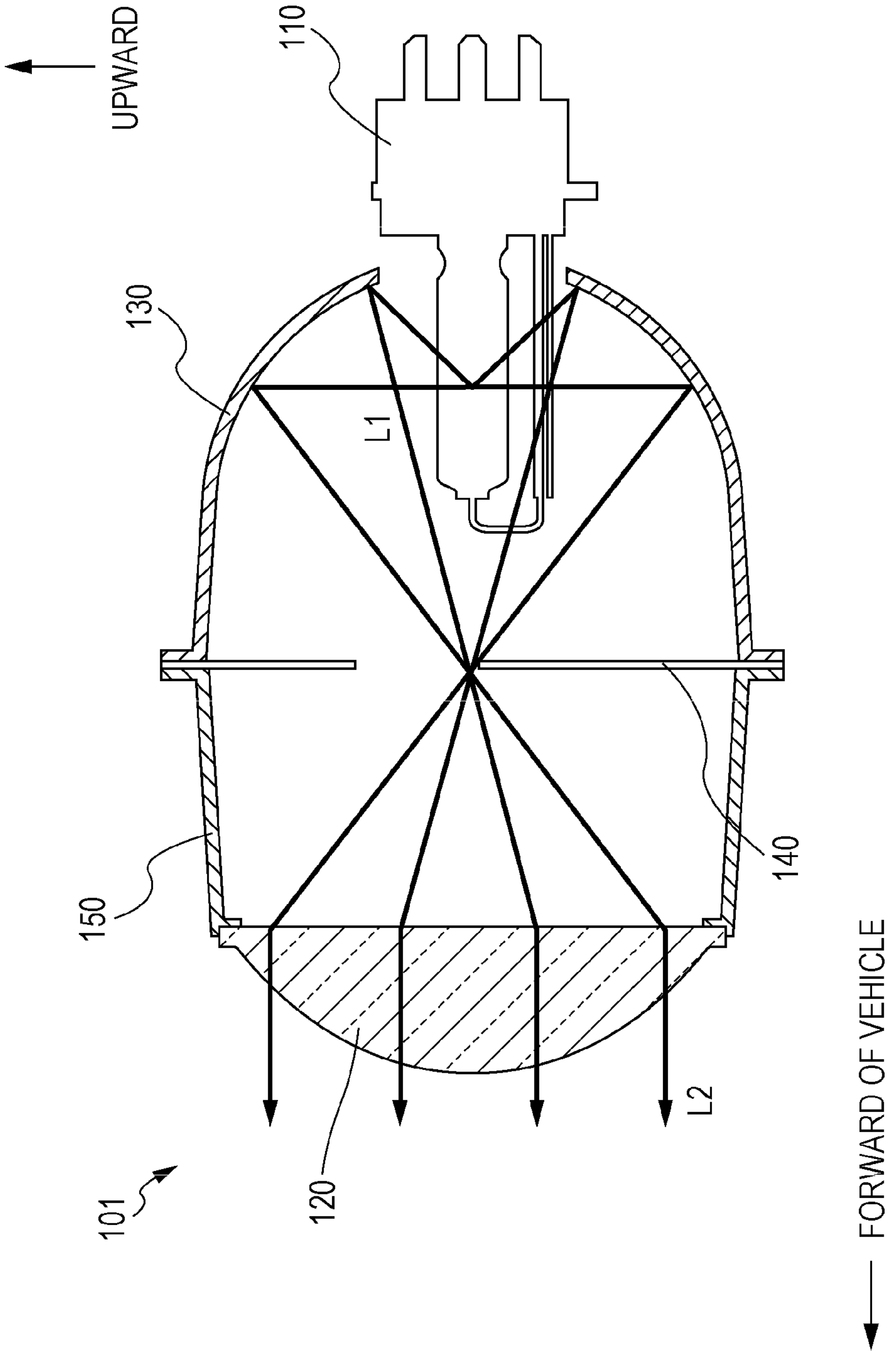
FIG. 5 is a sectional view of a vehicle headlamp according to a comparative example 1 of the present invention, wherein the headlamp is viewed as cut in a vertical plane, which passes through a center of a bulb and is along a front-to-rear direction of a vehicle.

As illustrated in FIG. 5, the vehicle headlamp 101 includes a bulb 110, a projector lens 120, a convergent reflector 130, a shade 140, and a lens holder 150, etc.

These are respectively configured to be substantially the same as the bulb 10, the projector lens 20, the convergent reflector 30, the shade 40, and the lens holder 50 of the embodiment. However, an opening corresponding to the opening 33 in the embodiment is not formed on the convergent reflector 130. A light-shielding pattern in the form of a stripe or the like is formed on the surface of the bulb 110 in order to make the cut line clear.

In the comparative example 1, the projector lens 120 projects all light fluxes for low beam.

The vehicle headlamp 101 also includes an unillustrated outer lens, a high-beams light source, and optical system, etc.

Figure 6:
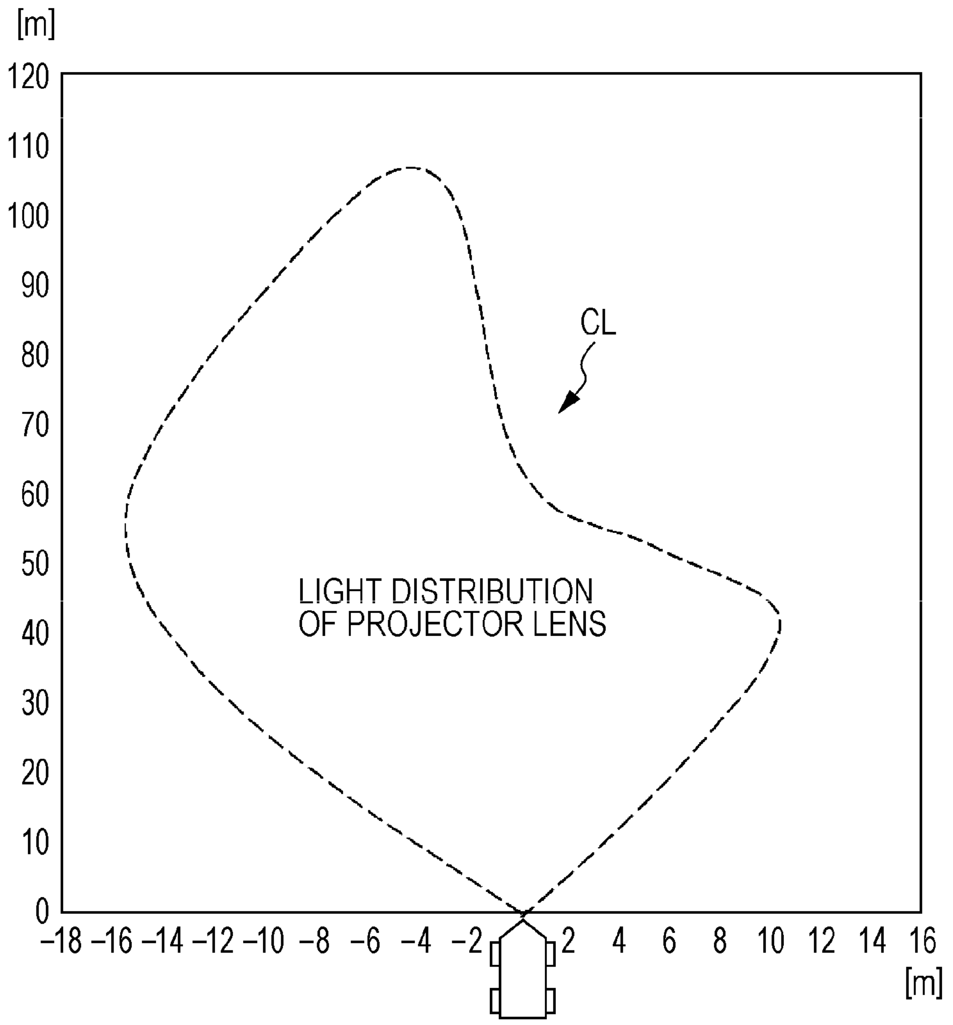
FIG. 6 is a view illustrating a light distribution pattern of the vehicle headlamp according to the comparative example 1.

FIG. 6 is a view illustrating a low-beam light distribution of the vehicle headlamp 101 in the comparative example 1.

In the comparative example 1, the projector lens 120 makes all light distributions, and the cut line CL is formed by projecting forward the shape of the edge of the shade 140.

COMPARATIVE EXAMPLE 2

A vehicle headlamp 201 in a comparative example 2 forms a low-beam light distribution pattern with a projection optical system and a parabolic reflector, like the embodiment. However, the light distribution in the vicinity of the cut line is performed by the projection optical system, while the parabolic reflector is used for the light distribution to a road shoulder near the vehicle.

Figure 7:
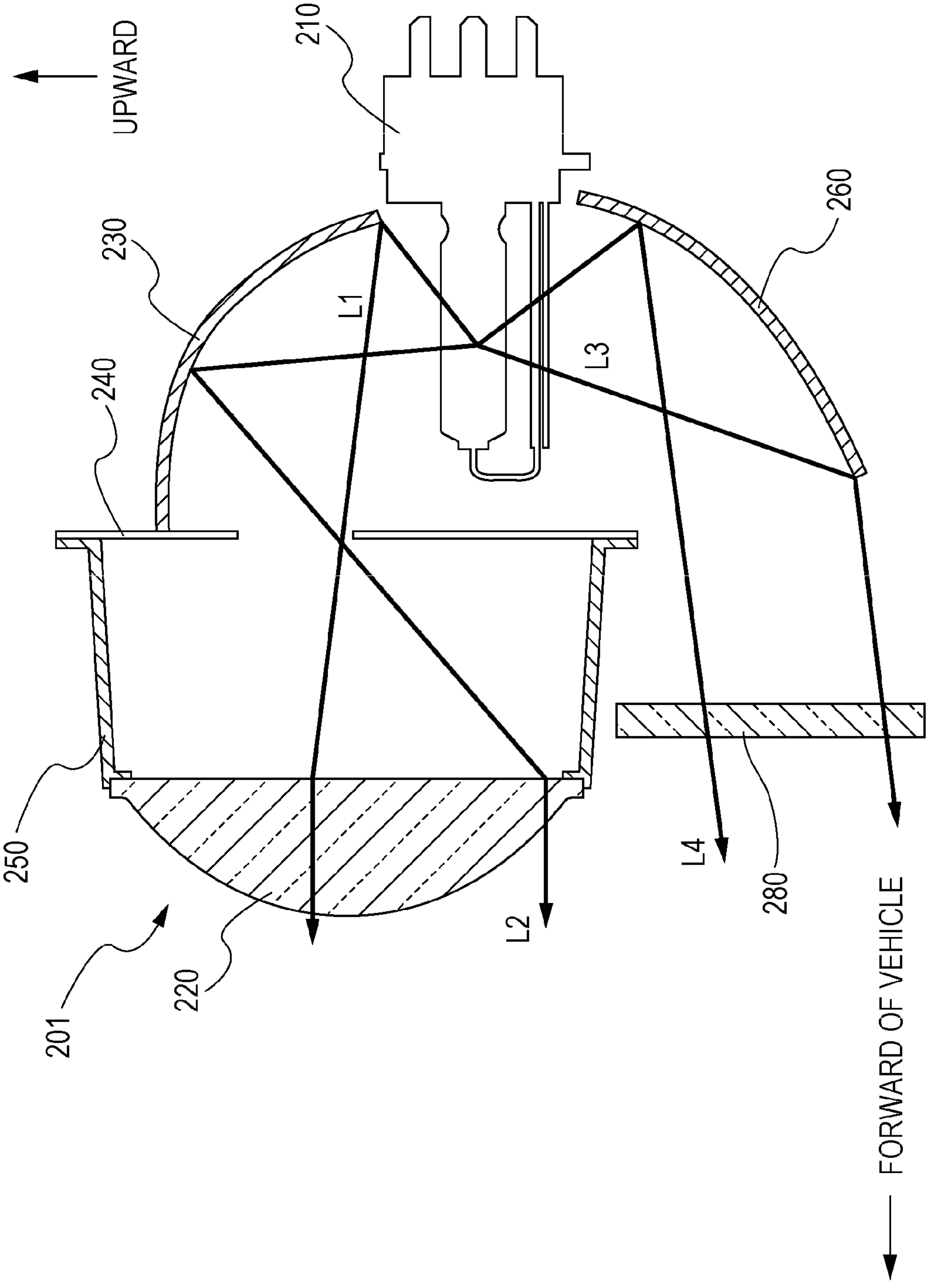
FIG. 7 is a sectional view of a vehicle headlamp according to a comparative example 2 of the present invention, wherein the headlamp is viewed as cut in a vertical plane, which passes through a center of a bulb and is along a front-to-rear direction of a vehicle.

As illustrated in FIG. 7, the vehicle headlamp 201 includes a bulb 210, a projector lens 220, a convergent reflector 230, a shade 240, a lens holder 250, a parabolic reflector 260, and an inner lens 280, etc.

The vehicle headlamp 201 also includes an unillustrated outer lens, a high-beam light source, and an optical system, etc.

The bulb 210 is a high-intensity discharge bulb like the bulb 10 in the embodiment. However, a pattern such as a stripe is formed on the surface of the bulb 210 in order to make the cut line clear.

The projector lens 220 is arranged at the front part of the vehicle as being offset upward with respect to the bulb 210.

The convergent reflector 230 is arranged above the bulb 210 for reflecting a light beam L1, emitted from the upper part of the bulb 210, so as to be converged on the vicinity of the rear-side focal point of the projector lens 220. After passing through the projector lens 220, the light beam L1 is irradiated in front of the vehicle as a light beam L2.

The shade 240 is arranged in the vicinity of the rear-side focal plane of the projector lens 220 so as to form a cut line for the low-beam light, distribution.

The lens holder 250 is a cylindrical member that is generally concentric with the optical axis of the projector lens 220. The projector lens 220 is fitted to the front end of the lens holder 250. The rear end of the lens holder 250 holds the shade 240 in cooperation with the front end of the convergent reflector 230.

The parabolic reflector 260 is arranged below the bulb 210. It reflects a light beam L3, emitted from the lower part of the bulb 210 and projects the same in front of the vehicle as a light beam L4 that is generally a parallel light.

The light beam L4 is irradiated from below the projector lens 220.

The inner lens 280 is arranged in front of the parabolic reflector 260 for complementing the color of the passing light beam L4 in order to allow the light beam L4 to be close to white light.

In general, light emitted from below the high-intensity discharge bulb might be yellowish due to the influence of deposition of a compound contained therein. Therefore, the inner lens 230 is colored with pink, for example.

Figure 8:
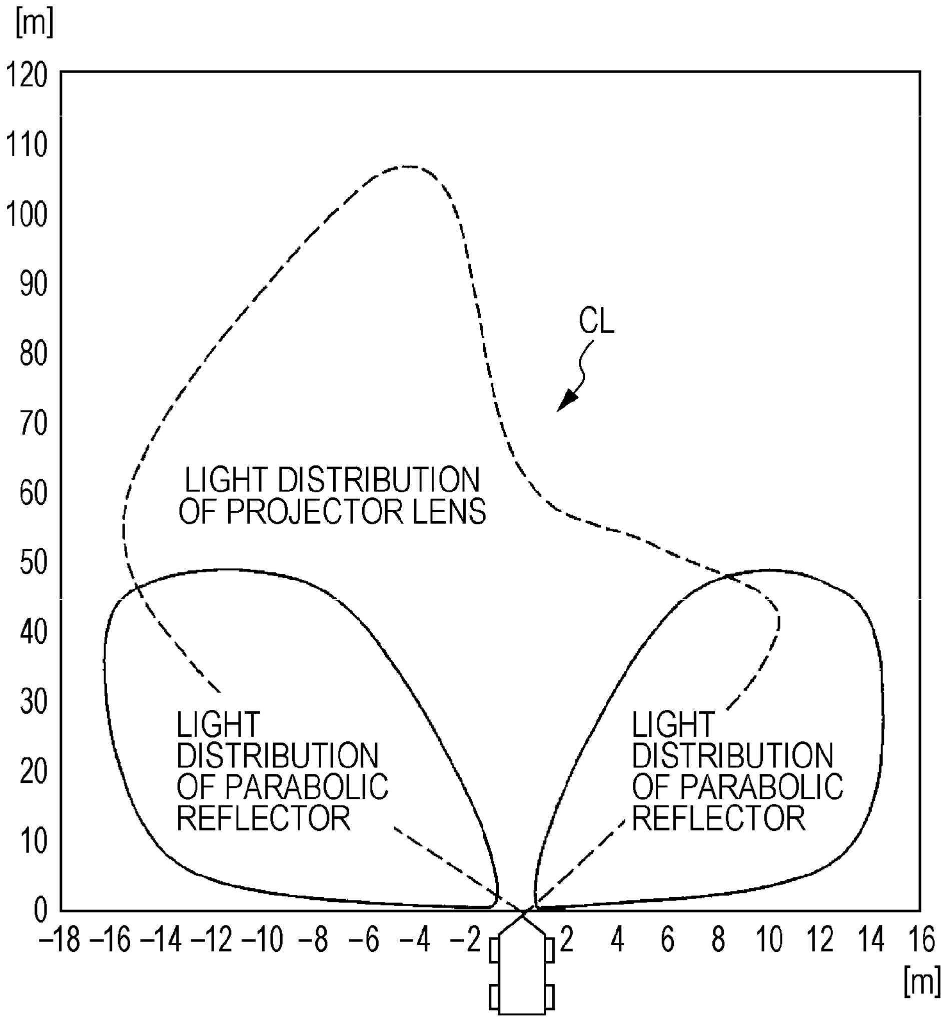
FIG. 8 is a view illustrating a light distribution pattern of the vehicle headlamp according to the comparative example 2.

FIG. 8 is a view illustrating a low-beam light distribution of the vehicle headlamp 201 in the comparative example 2.

In FIG. 8, the light distribution pattern by the parabolic reflector 260 is indicated by a solid line, while the light distribution pattern by the projector lens 220 is indicated by a broken line.

In the embodiment, the light distribution to a distance (upward) from the vehicle is performed by the projector lens 220, while the light distribution toward the right and left road shoulders near (downward) the vehicle is performed by the parabolic reflector 260.

In order to prevent the glare to the oncoming vehicle when the vehicle keeps to the left side of the road, a cut line CL for cutting a light flux ahead (upward) on the right is formed at the side of the projector lens 220, while the light, beam from the parabolic reflector 260 irradiates downward so as not to reach the cut line CL.

In the above-mentioned comparative examples 1 and 2, the cut line CL is formed by projecting the shape of the edge of the shades 140 and 240 arranged in the vicinity of the rear-side focal plane of the projector lenses 120 and 220, whereby the illumination intensity sharply changes in the vicinity of the cut line CL, which increases a contrast between a portion within the irradiation range and a portion outside the irradiation range.

Accordingly, when an optical axis is changed due to vehicle pitching, etc., a range that can be visually confirmed by a driver sharply changes, which might confuse the driver.

When the high-intensity bulb is used as a light source, a light-shielding pattern having a shape of a stripe, etc. has to be provided on the surface of the bulb in order to satisfactorily form a cut line, resulting in that efficiency is deteriorated due to a loss of light flux.

When the vehicle, in which the vehicle headlamp has a light distribution pattern for left-hand traffic, keeps to the right side of the road, or when a vehicle, in which a vehicle headlamp has a light distribution pattern for right-hand traffic, keeps to the left side of the road, a measure using a light-shielding seal or the like as in the embodiment cannot be applied. Therefore, it is necessary to previously avoid the light distribution to the range where glare can be generated when the vehicle travels on the opposite side, or to use a movable (switch type) shade or the like.

When the parabolic reflector 260 provided below the bulb 210 is used as in the comparative example 2, the degree of freedom of design for the light distribution pattern is enhanced. However, since the light beam from below the bulb 210 is used, the color has to be complemented by the colored inner lens 280, which makes the structure of the vehicle headlamp 201 complicated.

On the other hand, the embodiment can provide effects described below.

(1) On the parabolic reflector 60, the light distribution is designed by enlarging or reducing a focal point on the reflection surface, whereby the change in the illumination intensity near the cut line CL becomes moderate. Accordingly, is can be prevented that a range chat can be visually confirmed by a driver sharply changes, even when an optical axis is changed due to vehicle pitching, etc.

(2) Even when the high-intensity discharge bulb is used as the bulb 10, it is not necessary to provide a stripe light-shielding unit and the like, whereby a bulb having a large light quantity and having large light flux can be used.

(3) Since the projection optical system such as the projector lens 20 and the convergent reflector 30 irradiates downward with respect to the parabolic reflector 60, visibility of the portion just before the vehicle or the road shoulder can be enhanced.

(4) By attaching the detachable light-shielding seal S to the outer lens, the vehicle can easily meet the requirement in a country where the driver keeps to the side opposite to the side in Japan.

(5) The parabolic reflector 60 reflects the light beam. L3, emitted from above the bulb 10 or from the side of the bulb 10, and irradiates forward the same, whereby the complementary process by the colored inner lens and the like as in the comparative example 2 is unnecessary. Accordingly, the structure can be simplified.

(Modification)

The present invention is not limited to the is above-mentioned embodiment, but various modifications and changes are possible, and these fall within the technical scope of the present invention.

(1) The structure of the vehicle headlamp and the shape, material, and arrangement of the respective members are not limited to the above-mentioned embodiment, but can appropriately be changed.

For example, the parabolic reflector may be provided only above the projector lens, or may be arranged at the inner side of the projector lens in the width direction of the vehicle. When a part of the reflector is arranged below the high-intensity discharge bulb, a complementary unit may be provided only to the portion where the yellowish light beam becomes a problem.

(2) While the high-intensity discharge bulb, for example, is used as the light source in the embodiment, the present invention is not limited thereto. The other types of light sources may be used. For example, a halogen lamp or LED, etc. may be used.

(3) In the embodiment, the cut-off line is formed by the light-shielding unit provided at the light-incident side and the reflection side of the parabolic reflection surface. However, the present invention is not limited thereto. The cut line may be formed by another unit. For example, the cut line may be formed by the shape itself of the parabolic reflection surface.

What is claimed is:

1. A vehicle headlamp comprising:

a light source;

a projection optical system that includes a projection lens projecting an image, formed by a light beam emitted from the light source, in front of the vehicle; and a reflection optical system including a parabolic reflector that is provided at a position offset from the projection lens as viewed from the front of the vehicle, and that reflects the light beam emitted from the light source and irradiates the same in front of the vehicle, wherein the reflection optical system has a light distribution pattern irradiating a region including a cut line, and the projection optical system has a light distribution pattern irradiating downward with respect to the reflection optical system, and wherein a light-shielding unit for forming the cut line is provided at least either one of a portion between the light source and the reflector and a front portion of the reflector.

2. The vehicle headlamp according to claim 1, wherein at least a part of the reflector is provided above the lower end of the projection lens.

* * * * *